United States Patent [19]

Brooks, Jr.

[11] 4,038,093

[45] July 26, 1977

[54] CEMENT COMPOSITION FOR HIGH TEMPERATURE WELLS AND METHODS FOR PRODUCING THE SAME

[75] Inventor: Fred A. Brooks, Jr., Houston, Tex.

[73] Assignee: Exxon Production Research Company, Houston, Tex.

[21] Appl. No.: 622,294

[22] Filed: Oct. 14, 1975

[51] Int. Cl.² ............................................. C04B 7/353
[52] U.S. Cl. ........................................ 106/93; 106/315; 427/220; 427/221; 428/404; 428/407
[58] Field of Search ................ 427/220, 221; 428/404, 428/407; 106/93, 314, 315

[56] References Cited

U.S. PATENT DOCUMENTS

| 2,598,675 | 6/1952 | Cutforth | 106/93 |
|---|---|---|---|
| 2,629,667 | 2/1953 | Kaveler | 106/93 |
| 2,673,810 | 3/1954 | Ludwig | 106/93 |
| 2,844,480 | 7/1958 | Greminger | 106/93 |
| 2,880,096 | 3/1959 | Hurley | 106/93 |
| 3,245,814 | 4/1966 | Dunlap et al. | 106/93 |
| 3,483,007 | 12/1969 | Hook | 106/93 |
| 3,847,630 | 11/1974 | Compernass et al. | 106/93 |
| Re. 23,873 | 9/1954 | Ludwig | 106/93 |

Primary Examiner—Patrick P. Garvin
Assistant Examiner—John P. Sheehan
Attorney, Agent, or Firm—Salvatore J. Casamassima

[57] ABSTRACT

A cement composition suitable for cementing high temperature wells comprises dry cement grains coated with a tenacious film of a crosslinked hydroxyalkyl cellulose. The film resists high temperature hydrolysis and is effective to retard the setting of the cement in high temperature environments. The method of preparing the composition involves coating the dry cement grains, preferably by a microencapsulation process, with the crosslinked hydroxyalkyl cellulose film. The cement composition is particularly useful in cementing pipe strings in wells.

5 Claims, No Drawings

CEMENT COMPOSITION FOR HIGH TEMPERATURE WELLS AND METHODS FOR PRODUCING THE SAME

BACKGROUND OF THE INVENTION

1. Field of the Invention

This invention relates to cement compositions suitable for the cementing of high temperature wells and methods of producing such compositions.

2. Description of the Prior Art

Before a well is finally completed and allowed to produce, the well casing is secured in place by cementing. The normal procedure is to pump an aqueous slurry of a hydraulic cement down through the well casing and then upwardly in the annular space between the casing and the walls of the wellbore. Upon curing, the cement serves two important functions: (1) it seals the casing annulus, preventing pressure communication between vertically spaced formations and (2) it anchors the casing in place in the well. Other types of well completion procedures such as remedial cementing also involve cementing operations.

Cements used in oilfield cementing are hydraulic cements, usually the Portland or Pozzolan classes or mixtures of these. The cements are produced by burning an intimate mixture of finely divided calcareous and argillaceous material and grinding the resultant residue to produce fine powder. Oilfield cements are classified by the American Petroleum Institute and should be used in accordance with the recommendations of that organization (see API specification for oilwell cement and cement additives, API standard 10-A, 16th Edition, April 1971).

The amount of water added to the cement to form the aqueous slurry varies between about 4 to 5 gallons per sack depending upon the API class. This concentration provides a slurry density between about 15.6 and 16.5 pounds per gallon. The rheological properties of the slurry are controlled by adding Bentonite or other additives to the slurry to increase its viscosity or adding thinners to reduce its viscosity.

With any well-cementing procedure, the slurry must remain fluid for a sufficient length of time to allow completion of the job. A problem frequently encountered in cementing high temperature formations is early setting of the cement since temperatures accelerate the hydration of the cement components and thereby decrease thickening time. This problem is particularly acute with deep wells where formation temperatures frequently exceed 250° F. In addition, deep wells require increased pumping time to pump the cement to greater depths. This combination of high temperature and increased pumping time necessitates the use of additives which retard the rate of thickening of the cement so that all of the cement can be pumped into place in the well before it begins to set.

Two commonly used cement retarder additives are calcium lignosulfonate and carboxymethyl hydroxyethyl cellulose (CMHEC). Calcium lignosulfonate is an effective retarder at moderate temperatures and also acts as a dispersant for other cement additives such as bentonite. CMHEC is used as a retarder and is also extensively employed for the purpose of reducing water loss to the formation. Normally, a small amount of the retarder is dry blended with the cement and an aqueous slurry of this mixture is then introduced into the well. The cementing procedure is then completed in the usual fashion.

The problem with these retardation compositions is that they are frequently unpredictable, especially at temperatures over 250° F. It has been found that small changes in retarder concentration or formation temperature can result in unacceptably large variations in slurry thickening time and compressive strength development. On-site blending of retarder and cement adds to the problem because of the difficulty in thoroughly blending a small amount of retarder with a relatively large amount of cement. If not homogeneously blended, the retarder will be present in different proportions throughout the mixture resulting in unpredictable cement retardation and nonuniform compressive strength development.

SUMMARY OF THE INVENTION

The purpose of the present invention is to provide an improved retarded cement composition particularly useful in high temperature wells.

The cement composition comprises a hydraulic cement wherein the dry cement grains are coated with a tenacious film of a crosslinked hydroxyalkyl cellulose. The film, which provides a physical barrier between the cement grains and the aqueous slurry, hydrolyzes slowly at high temperatures. As a result, the film acts as an effective retarder which is highly insensitive to changes in temperature. Furthermore, since the retarder is coated on to the cement, rather than blended with the cement, the problem of slight variations in retarder concentration resulting from heterogeneous blending does not exist.

Application of the retarder film to the cement grains can be accomplished by any of the well known particle coating techniques. A preferred method is to microencapsulate the cement grains with crosslinked hydroxypropyl cellulose. At least 20 percent of the cement grains should be coated to insure an API thickening time of at least 3 hours at 172° F.

The final product is a dry cementitious composition having an inhibited rate of set. The setting characteristics of the composition are insensitive to high temperatures and wide temperature fluctuations, thereby giving the composition a predictable rate of set and uniform compressive strength development.

DESCRIPTION OF THE PREFERRED EMBODIMENT

The cement composition of the present invention comprises a hydraulic cement wherein the dry cement grains are coated with a tenacious film of a crosslinked hydroxyalkyl cellulose. By providing a physical barrier between the cement grains and the water present in the cement slurry, the film retards the rate of set of the cement. Not until the film hydrolyzes will the coated cement grains be exposed to the external aqueous phase.

Films of crosslinked hydroxyalkyl cellulose are resistant to high temperature hydrolysis. The rate of hydrolysis of the film is, therefore, relatively insensitive to changes of temperature. Consequently, film behavior is mainly a function of film thickness and the rate of hydrolysis. Since these variables are usually known, the film behaves in a predictable manner over a wide temperature range. Cement coated with this film thus exhibits a rate of set which is much less temperature sensitive than cement blended with conventional retarders, making the cement suited for use in deep, high temperature wells.

Since the film provides a barrier for the cement grains it does not directly interfere with the chemical reactions involved in the setting of the cement. As a result, small variations in the concentration of the retarder film or in film thickness will not appreciably alter the rate of set. Unlike other cementitious compositions, it is not essential to use extreme caution in obtaining a thoroughly mixed blend. The blending action of preparing the cement slurry will provide all the necessary mixing when the composition of the present invention is used. Because the individual cement grains are to be coated, the coating procedure will be more conveniently carried out at the cement manufacturing mill or at an intermediate bulk plant such as a service company facility. This would avoid the problems associated with on-site blending.

It is not necessary that all of the cement grains be completely coated with the crosslinked hydroxyalkyl cellulose. Any degree of coating will provide overall retardation of setting. However, it is preferred that at least about 20 percent of the total cement grain surface area be coated with the film. This amount of coating will give the cement an API casing simulation schedule thickening time of at least 3 hours at 172° F. An API thickening time of 3 hours or more is generally considered necessary for effective retardation.

The film can be applied to the cement grains by any of the well-known grain coating techniques such as microencapsulation. Microencapsulation of the cement grains assures a relatively uniform application of the film on the grains which, in turn, gives the cement a more predictable thickening time.

The preferred coating method of the present invention is an in-situ microencapsulation technique which gives close control over film thickness. By this method, the hydroxyalkyl cellulose is dissolved or suspended in a nonaqueous liquid carrier and the dry cement grains are then blended with the liquid carrier to form a slurry. The use of aqueous mediums must be avoided in order to prevent water absorption by the cement grains.

The next step is to polymerize or crosslink the hydroxyalkyl cellulose. This is accomplished by adding a catalyst or crosslinking agent to the slurry while simultaneously agitating the slurry and heating it to the crosslinking temperature of the hydroxyalkyl cellulose. In this manner, a film of the crosslinked hydroxyalkyl cellulose gradually builds up on the cement grains in successive layers.

The final step is to remove the nonaqueous liquid carrier. If the liquid carrier is a low boiling point organic solvent then it can be distilled off simultaneously with the crosslinking step. On the other hand, if the carrier is a high boiling point liquid it can be washed away with a suitable nonaqueous solvent.

The final product of the above process is a dry cement composition having some or all of its grains coated with a thin film of a crosslinked hydroxyalkyl cellulose. Since the crosslinking partially insolubilizes the hydroxyalkyl cellulose the film will resist high temperature hydrolysis. As a result, the cement composition will have a rate of set which is very insensitive to high temperatures or wide temperature fluctuations. When used to cement deep well formations which exhibit temperatures that vary internally from surface temperatures to 300° F or higher, the cement composition of the present invention will exhibit a retarded rate of set which is highly predictable and will display uniform compressive strength development.

Although crosslinked films of hydroxyalkyl cellulose are generally suitable as high temperature barriers for cement grains, the preferred films is one which is made from crosslinked hydroxypropyl cellulose (HPC). This is because HPC, after it has been hydrolyzed, continues to serve as an effective retarder in the aqueous cement slurry. The hydrolyzed HPC also increases the water retentivity of the slurry and therefore reduces water filtration losses to the formation. In addition, the HPC, acting as an effective thixotropic agent, increases and stabilizes slurry viscosity. The improved slurry properties obtained with HPC will normally result in a set cement with high compressive strength.

The coated cement composition of the present invention can be used in conjunction with conventional chemical additives, such as CMHEC or calcium lignosulfonate, which can be dry blended with the coated cement composition. Once the slurry is prepared, the chemical additives will act immediately to retard setting and reduce water loss. However, as the cement slurry is pumped down the casing and then up the annular space between the casing and the wellbore, its temperature will increase and the conventional additives will begin to lose their effectiveness as retarders. At this stage, the barrier film on the cement grains will take over as the primary setting inhibitor. The other additives, however, will continue to behave as thixotropic agents and will assist in maintaining high slurry viscosity and low fluid loss.

EXAMPLE

Cement grains from a 645 gram sample of API Class H cement were coated with a film of crosslinked hydroxypropyl cellulose by a microencapsulation process.

About 5.8 grams of hydroxypropyl cellulose were dissolved in about 600 milliliters of a monomethyl ether of ethylene glycol. The ethylene glycol ether which is manufactured by Union Carbide and sold under the tradename Methyl Cellosolve, acts as a solvent carrier for the hydroxypropyl cellulose. This hydroxypropyl cellulose solution was then blended with the dry cement to form a nonaqueous slurry.

A crosslinking agent was then stirred into the slurry while the slurry was being heated to 180° C, the crosslinking temperature of hydroxypropyl cellulose. The crosslinking agent used was a fatty acid chrome complex which is manufactured by duPont and is sold under the tradename of Quilon S.

While the slurry was being agitated and heated, the ethylene glycol ether was allowed to gradually distill off. The crosslinking reaction was considered complete when all of the ethylene glycol ether had been distilled, thus leaving behind a dry, granular cementitious composition. Observation of the individual cement grains under a microscope indicated that about 25 percent of the grains had been microencapsulated with crosslinked hydroxypropyl cellulose.

A 517 gram sample of the coated cement with a grain size in the range of 80 to 325 mesh was tested to determine thickening time. An API Casing Cementing Schedule which is designed to simulate cementing of a well having a depth of 12000 feet and temperature of 172° F, was followed. The elapsed time between the initial application of pressure and temperature of the apparatus and the occurrence of a consistency of 100 Uc was reported as the cement thickening time.

The aqueous slurry prepared with the partially coated cement thickened to 100 Uc after 3 hours and 20 minutes. By comparison, a conventional cement slurry, prepared from untreated class H cement, had a thickening time of 1 hour and 43 minutes.

The procedure for cementing a casing string in a well using the improved retarded cement may be performed with conventional equipment and techniques. The following briefly describes one such procedure. A casing string provided with a guide shoe, a float collar, and other cementing equipment such as centralizers and scratchers, is lowered into the wellbore and landed at the proper location. Mud is then circulated through the casing string and up the annulus until returns are reasonably free of cuttings.

While reciprocating and rotating the pipe, pumping operations are commenced. Initially, a preflush, usually water, is pumped down the casing string. The preflush is followed with the cement slurry in which at least 20% of the cement particles have been coated with the retarding film. The slurry may be mixed on the run. A wiper plug separates the preflush and the cement slurry. The displacement of the preflush with the cement slurry should be performed at turbulent flow conditions to provide good mixing at the liquid interface. The cement slurry is followed with a cement displacing fluid such as mud and a top cement plug is employed between the displacing fluid and the cement slurry. Displacement of the cement slurry is continued until the top plug lands on the bottom plug at the float collar. The cement is then permitted to cure.

The improved retarded cement will reduce the risk of the cement prematurely setting before the pumping operations are completed.

Although the present invention has been described with reference to primary casing cementing operations, it should be emphasized that the principles of the invention are applicable to other cementing operations such as remedial cementing.

I claim:

1. A composition suitable for cementing high temperature wells comprising a hydraulic cement wherein at least about 20 percent of the surface area of the dry grains of said hydraulic cement are coated with a film of a crosslinked hydroxyalkyl cellulose which has been polymerized on to the surface of said cement grains and which is effective to retard the rate of set of said cement.

2. The composition as defined in claim 1 wherein said crosslinked hydroxyalkyl cellulose is crosslinked hydroxypropyl cellulose.

3. A method of retarding a hydraulic cement used for high temperature wells which comprises coating at least about 20 percent of the surface area of the dry grains of said hydraulic cement with a film of crosslinked hydroxyalkyl cellulose by polymerizing said hydroxyalkyl cellulose in a nonaqueous medium on to the surface of said cement grains without appreciably admixing said hydroxyalkyl cellulose with said grains, said film being effective to retard the rate of set of said hydraulic cement.

4. The method as defined in claim 3 wherein said crosslinked hydroxyalkyl cellulose is crosslinked hydroxypropyl cellulose.

5. The method as defined in claim 3 wherein said dry grains are coated by microencapsulating said grains with a crosslinked hydroxyalkyl cellulose.

* * * * *